United States Patent [19]

Caron

[11] Patent Number: 5,442,957

[45] Date of Patent: Aug. 22, 1995

[54] CALIBRATION TECHNIQUE FOR PRODUCTION MASS AIR FLOW SENSOR FLOW STANDS

[75] Inventor: Richard W. Caron, Canton, Mich.

[73] Assignee: Ford Motor Company, Dearborn, Mich.

[21] Appl. No.: 270,551

[22] Filed: Jul. 5, 1994

[51] Int. Cl.⁶ .................................. G01F 25/00
[52] U.S. Cl. ............................ 73/168; 73/3
[58] Field of Search ............ 73/3, 168, 118.1, 118.2

[56] References Cited

U.S. PATENT DOCUMENTS

| | | | |
|---|---|---|---|
| 4,584,876 | 4/1980 | Aprill, Jr. | 73/168 |
| 4,645,174 | 2/1987 | Hicks | 73/3 |
| 4,753,095 | 6/1988 | Jones, Jr. et al. | 73/3 |

Primary Examiner—Robert Raevis
Attorney, Agent, or Firm—Peter Abolins; Roger L. May

[57] ABSTRACT

A mass air flow sensor calibration air flow stand is tested during production by substituting a nozzle supplying a predetermined amount of air flow for a mass air flow sensor in the production line. The calibration air flow stand is supplied air from the nozzle. If the calibration air flow stand is operating properly the flow in the air flow stand is the same as the predetermined amount of air flow.

10 Claims, 2 Drawing Sheets

CALIBRATION TECHNIQUE FOR PRODUCTION MASS AIR FLOW SENSOR FLOW STANDS

BACKGROUND OF THE INVENTION

1. Field of the Invention

This invention relates to the field of mass air flow sensors and in particular to a production line test apparatus.

2. Prior Art

As part of the normal production process, mass air flow sensors must travel along the production line. In the prior art it was known to test electronics for, first, response time and, second, hot wire temperature set. However, it was not considered to be critical that air flow be controlled during the tests and setting of the parameters. That is, typically air flow was not controlled accurately and there was no measurement of air flow. These are some of the problems this invention overcomes.

During the initial stages of the production process, the mass air flow sensor's electronics module and sensing elements are assembled outside of a cast sensor housing. This initial assembly takes place along a production line on a production mass air flow sensor carrier. The mass air flow sensor electronics module and mass air flow sensor total assembly must be air flow tested at various stations on the production line during this initial assembly. At these air flow test stations, there are production air flow stands that are setting and measuring air flow rates with extreme accuracy. To maintain this level of accuracy, periodic air flow calibrations must take place. It would be desirable to have a calibration carrier for production mass air flow sensor flow stands to accomplish this task. The calibration carrier allows production air flow stands to be calibrated with a high degree of accuracy, while in-process, this minimizing flow stand down time.

During the final stages of the production process, the mass air flow sensor's electronics module and sensing elements are mated to the sensor's housing. This final production process takes place on a production pallet. The mass air flow sensor must be air flow tested at various stations on the production line during this final assembly. At these air flow test stations, production air flow stands set and measure air flow rates with extreme accuracy. To maintain this level of accuracy, periodic air flow calibrations should take place. Such calibrations have typically not been done or have been done by taking the air flow stands off the production line. The calibration is then done in a laboratory. It would be desirable to calibrate production air flow stands with a high degree of accuracy, while in-process, and minimize air flow stand down time. A calibration nozzle set and fixtures for production air flow stands in accordance with an embodiment of this invention accomplish this task.

SUMMARY OF THE INVENTION

A carrier is used to carry mass air flow sensor electronics along the production line, and a pallet is used to carry a completed mass air flow sensor assembly along the production line. Both the carrier and the pallet can be used for calibration purposes by carrying a calibration nozzle or calibration test fixture.

This invention uses calibration nozzles for fast, accurate in-process calibration testing of mass air flow sensor production flow stands. A calibration carrier uses a sonic nozzle as a measurement device to provide excellent test-to-test repeatability, and has physical dimensions identical to those of a production carrier so it can travel on the production line, providing in-process calibration testing, with minimum down-time. The repeatability of the sonic nozzle with its critical flow venturi is what gives the calibration carrier its excellent accuracy and test-to-test repeatability characteristics.

This invention also allows for fast, accurate in-process calibration testing of a production air flow stand during a portion of the production line carrying the mass air flow sensor body. The calibration pallet for carrying the calibration test fixture along the production line is identical to the production pallet for carrying the mass air flow sensor along the production line. Thus the calibration pallet for the calibration test fixture can travel on the production line providing in-process calibration testing, with reduced down time.

DETAILED DESCRIPTION OF THE INVENTION

Figure 1:
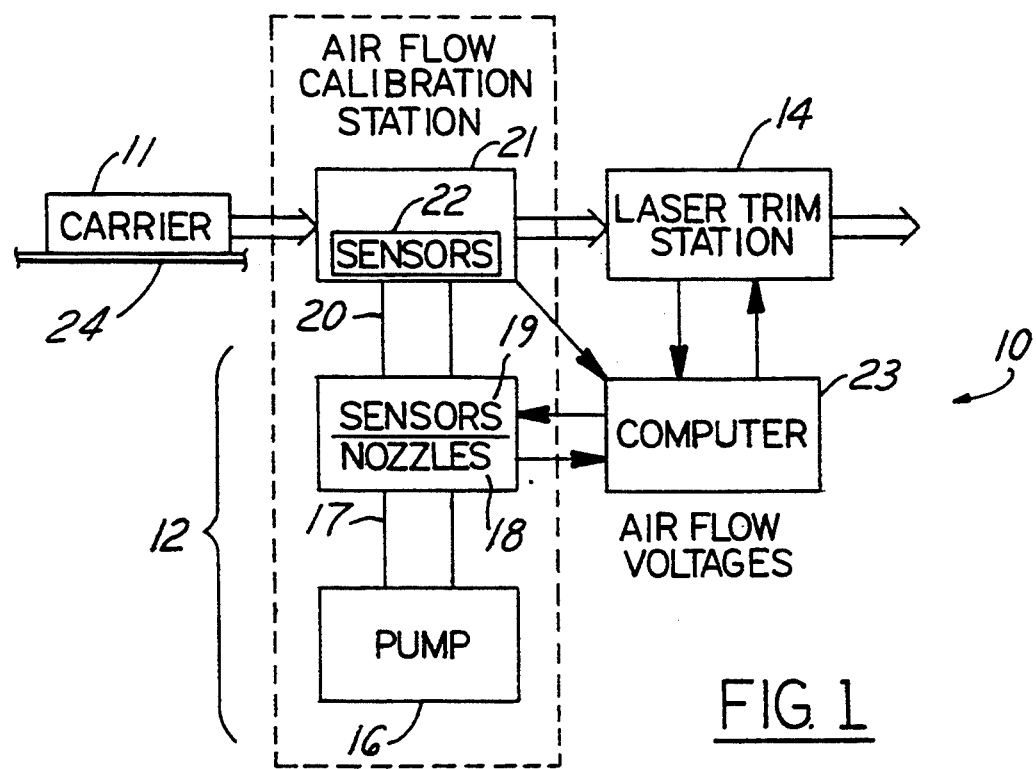
FIG. 1 is a block diagram of a calibration nozzle set and a production air flow stand in accordance with an embodiment of this invention.

Referring to FIG. 1, a production line test system 10 for a mass air flow sensor includes a carrier 11 for carrying a mass air flow sensor to an air flow calibration station 12. Calibration station 12 includes an air flow system for providing a known quantity of air flow. Typically, a variety of output flow nozzles at the output of flow system 12 provide a precisely known air flow. A vacuum source 16 (e.g. a pump) for providing air flow is coupled through an air flow path 17 to a sonic nozzle assembly 18 which has associated sensors 19. Sonic nozzle assembly 18 is coupled through an air flow path 20 to an air flow calibration station 21 which is in the production line 24 of the mass air flow sensor. Air flow calibration station 21 has associated sensors 22. A computer 23 is coupled to sensors 22 and 19, calibration station 21 and sonic nozzle assembly 18.

To determine air flow at calibration station 21 and at sonic nozzle assembly 18 measurements of pressure, temperature and humidity are taken and combined with a known throat area for the nozzles passing the air flow in accordance with the following calculation:

$$\dot{M} = \frac{PAC_dC^*}{\sqrt{T}}$$

Wherein:
$\dot{M}$ = mass air flow
$P$ = nozzle pressure
$A$ = nozzle throat area
$C_d$ = nozzle discharge coefficient These values determined by calibration lab when nozzle is calibrated prior to installation

|  |  | in flow system |
| --- | --- | --- |
| C* | = critical flow factor | Equation that includes the ideal gas constant for air and the humidity of the flowing air |
| T | = nozzle temperature |  |

Calibration station 21 may used for testing just the electronic portion of the mass air flow sensor or the entire mass air flow sensor. If just the electronic portion is being tested it is desirable to have a special calibration carrier which provides an air flow correlating to the air flow that the electronic portion would receive if it were part of a completed mass air flow sensor. If calibration station 21 is used for testing the entire mass air flow sensor then it is desirable to calibrate the station using a nozzle of precisely known throat area inserted in a calibration test fixture and carried by a calibration pallet which is compatible with the production line when production mass air flow sensors are being produced. When this known quantity of air is provided, many operations and tests can be performed on a mass air flow sensor during its fabrication.

As can be appreciated, the successful operation of system 10 depends on flow system 12 providing the known air flow. Periodically, it is desirable to verify this known air flow. To accomplish verification, either a calibration carrier or calibration test fixture is used. For portions of the production line that use a carrier to transport the mass air flow sensor electronics, a calibration carrier is used. For portions of the production line that use a pallet to transport the mass air flow sensor as mated to its housing, a calibration test fixture is used.

Figure 5:
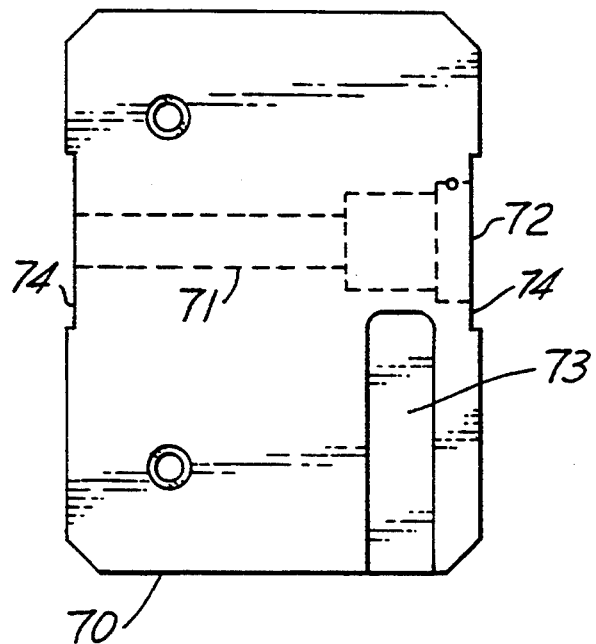
FIG. 5 is a top view of a calibration carrier in accordance with an embodiment of this invention.
Figure 6:
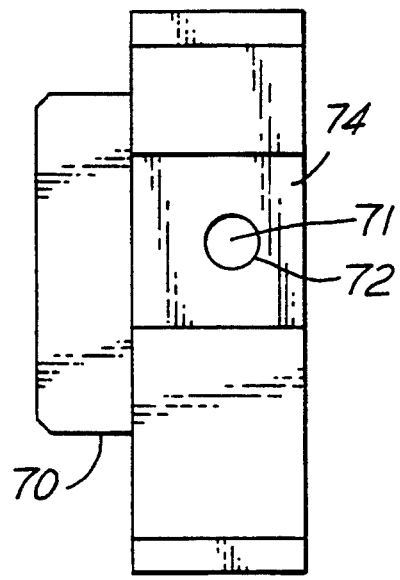
FIG. 6 is a side view of a calibration carrier in accordance with an embodiment of this invention.

Referring to FIGS. 5 and 6, a calibration carrier 70 includes an air flow passage 71. Coupled to air flow passage 71 is a sonic nozzle 72 for passing air in a controlled manner. Calibration carrier 70 includes a bar code label 73 which can be used to identify the carrier and the particular sonic nozzle. Carrier 70 at each end of the air flow passage 71 has a sealing surface 74 for coupling to the remainder of the air flow path.

In accordance with an embodiment of this invention, a calibration carrier is used to establish a flow rate and measure the air flow. A stand for measuring flow clamps to the calibration carrier and it measures flow. If the flow is not correct then a possible cause is that there is a leak in the system and the leak should be corrected.

In operation, the calibration carrier is placed onto the mass air flow sensor production line 24, upstream of the production flow stand to be tested. As the carrier enters the production flow stand's material handler, its bar code label is read. Upon reading the identifying bar code label, the flow stand determines that this is a calibration carrier, and initiates a flow stand air flow calibration test procedure. First, based on the identifying bar code label, the calibration data of the sonic nozzle inside the calibration carrier, is retrieved from memory of computer 23. Second, the calibration carrier is lifted and located into test position by the production flow stand's material handling system. Next, the production flow stand mates its air flow equipment with the calibration carrier's two air flow passage sealing surfaces. These surfaces are used to provide a sealing surface for the air flow equipment's o-ring seals. Then the production air flow stand starts the air flow.

Once the calibration carrier's nozzle is operating at critical sonic flow, the air flow rate into the production flow stand is set. Then by comparing the calculated flow rate of the calibration carrier's sonic nozzle with the flow stand's calculated flow rate, the calibration of the production flow stand can be determined. The time needed to perform this air flow calibration, is about the same as a normal production air flow test sequence. Thus the flow stand can be calibrated, in-process with a minimum of down time.

Figure 2:
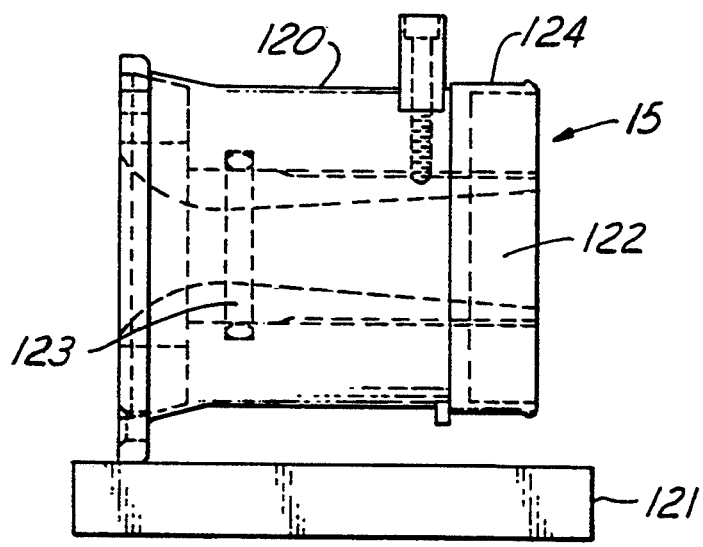
FIG. 2 is a side view of a calibration nozzle in accordance with an embodiment of this invention.
Figure 3:
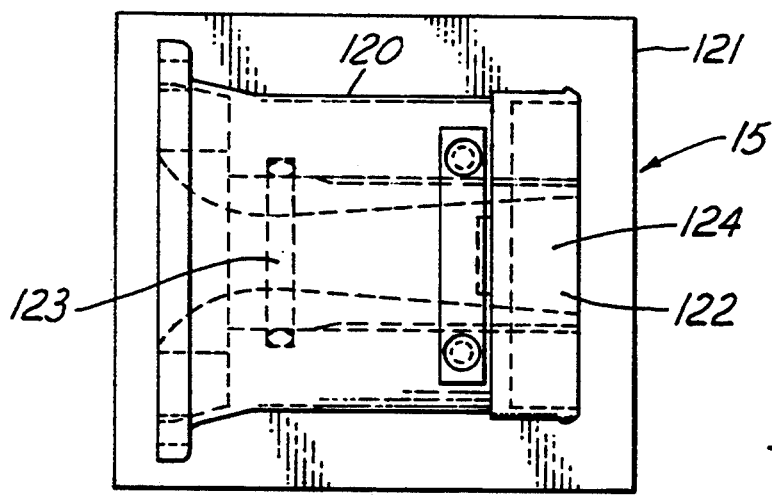
FIG. 3 is a top view of a calibration nozzle in accordance with an embodiment of this invention.
Figure 4:
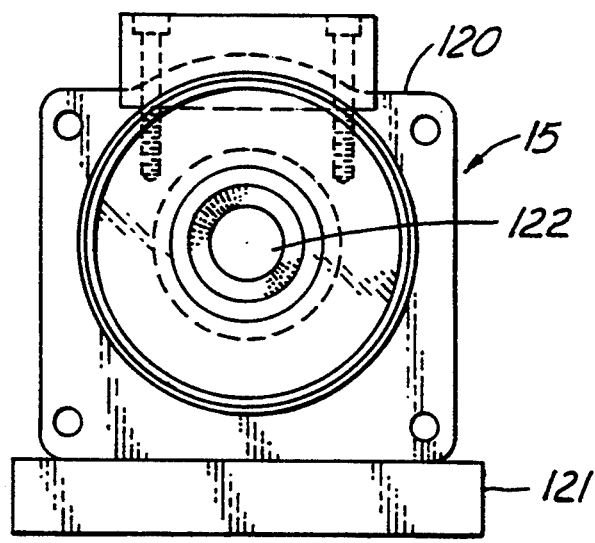
FIG. 4 is an end view of a calibration nozzle in accordance with an embodiment of this invention.

Referring to FIGS. 2, 3 and 4, nozzle assembly 15 includes calibration test fixture 120 which is mounted on a calibration pallet 121 and supports calibration nozzle 122. An O-ring 123 is mounted around calibration nozzle 122 to provide sealing. For identification a bar code label 124 is attached to calibration test fixture 120.

The outside physical dimensions of calibration test fixture 120 are identical to a mass air flow sensor being produced on the production line. There are as many different calibration test fixtures as there are different mass air flow sensors being produced. Then a calibration nozzle is selected and placed inside of the calibration test fixture. As the calibration nozzle is placed inside of the calibration test fixture, an o-ring contained in the calibration test fixture is compressed, thus providing an air tight seal. The calibration nozzle's bar code label is then attached to the calibration test fixture to provide easy identification of the nozzle. The calibration test fixture is then placed on the calibration pallet.

In operation, the calibration test fixture is placed onto the mass air flow sensor production line, upstream of the production flow stand to be calibrated. As the calibration test fixture enters the production flow stand's material handler, the bar code label of the calibration test fixture is read. Upon reading this unique bar code label, the flow stand determines that this is a calibration test fixture, and initiates a flow stand air flow calibration test procedure. First, based on the unique bar code label, the calibration data of the calibration nozzle is retrieved from memory. Second, the calibration pallet is lifted and located into test position by the production flow stand's material handling system. Next, the production flow stand mates its air flow equipment to the calibration test fixture, as it would for any mass air flow sensor being air flow tested. Based on the calibration nozzle selected, the flow stand's computer will select a sonic nozzle or combination of some nozzles, from it's sonic nozzle chamber, to be calibrated using the calibration test fixture. Then the production flow stand starts its air flow calibration.

The test sequence has been described and can be repeated with different calibration nozzles, such as to calibrate each individual sonic nozzle in the production flow stand, along with numerous sonic nozzle combinations. By changing the calibration test fixtures, the flow stand's air flow equipment integrity can also be verified by comparing the calibration results of the different calibration test fixtures.

As long as a sonic nozzle is at a critical sonic flow condition, its air flow rate will be constant. Given that a sonic nozzle is a calibrated measurement device, by using highly accurate pressure and temperature transducers to measure upstream pressure and temperature, the mass air flow rate through the sonic nozzle can be calculated with a high degree of accuracy. Selecting nozzles with different throat areas will change the amount of air passing through the nozzle system. A downstream pressure measurement is used to monitor if the sonic nozzle is operating at sonic flow conditions. The flow stand's pressure and temperature sensors are used during calibration testing. A barometric pressure transducer provides an upstream pressure measurement of calibration sonic nozzle. A nozzle chamber pressure transducer provides a downstream pressure measurement of calibration sonic nozzle and upstream pressure measurement of flow stand sonic nozzle(s). A vacuum pump pressure transducer provides a downstream pressure measurement of flow stand sonic nozzle(s). An ambient air temperature transducer provides an upstream temperature measurement of calibration sonic nozzle. A nozzle chamber temperature transducer provides an upstream temperature measurement of flow stand sonic nozzle(s). A downstream pressure measurement is used to monitor if the sonic nozzle is operating at sonic flow conditions.

Various modifications and variations will no doubt occur to those skilled in the arts to which this invention pertains. Such variations which generally rely on the teachings through which this disclosure has advanced the art are properly considered to be within the scope of this invention.

What is claimed:

1. An apparatus for calibrating a production air flow stand of a mass air flow sensor production line, the production air flow stand generating a predetermined air flow for testing the mass air flow sensors, the apparatus comprising:
    an air flow calibration test fixture for producing a calibrated mass air flow, said air flow calibration test fixture receivable on the mass air flow sensor production line upstream of the air flow stand and carried by the mass air flow sensor production line into the production air flow stand;
    measuring means responsive to said air flow calibration test fixture being received in the production air flow stand for measuring an actual air flow in the air flow stand; and
    comparison means for comparing said calibrated mass air flow and said actual air flow in the air flow stand to determine an error when the calibrated and actual air flows are not the same.

2. The apparatus as recited in claim 1 wherein said air flow calibration test fixture includes:
    an adapter carrier mountable on the mass air flow sensor production line which normally carries the mass air flow sensors; and
    a calibrated nozzle attached to said adapter adapted to mate with the production air flow stand, said calibrated nozzle capable of producing said calibrated air flow.

3. The apparatus as recited in claim 2 wherein said calibrated nozzle is a sonic nozzle.

4. The apparatus as recited in claim 1 wherein said air flow calibration test fixture includes:
    a calibrated nozzle adapted to mate with the production air flow stand.

5. A method of testing a mass air flow sensor production flow stand disposed along a mass air flow sensor production line, including the steps of:
    providing a calibrated nozzle adapted to mate with a production carrier for a mass air flow sensor, said calibration nozzle operative to produce a calibrated air flow;
    providing the production flow stand with a first sonic nozzle having a predetermined throat area for supplying a predetermined amount of air flow through the production flow stand;
    mounting said carrier on the mass air flow sensor production line upstream of the production flow stand;
    transporting said carrier on said mass air flow sensor production line into said production flow stand;
    calculating the mass air flow provided by said calibrated nozzle to generate a calculated mass air flow;
    passing the mass air flow provided by said calibrated nozzle through the production flow stand;
    measuring the mass air flow passing through the production flow stand using said first sonic nozzle to generate a measured mass air flow;
    comparing said measured mass air flow passing through the production flow stand to said calibrated mass air flow; and
    determining that the mass air flow through production flow stand is out of calibration when the measured mass air flow passing through the production flow stand is not the same as said calibrated mass air flow.

6. The method of testing as recited in claim 5 further comprising the step of:
    changing the size of the throat area of said first sonic nozzle to change the amount of air passing through the flow stand.

7. The method of testing as recited in claim 6 wherein the step of measuring the mass air flow passing through the production flow stand includes the steps of:
    measuring the air pressure upstream of said first sonic nozzle;
    measuring the temperature of the air in the air flow;
    measuring the humidity of the air in the air flow;
    determining nozzle throat size of said first sonic nozzle;
    retrieving the calibration data of said first sonic nozzle from a computer memory; and
    calculating said measured mass air flow based on the pressure of the air, the temperature of the air, the humidity of the air, and the throat size of said first sonic nozzle.

8. The method of testing as recited in claim 5 wherein the step of calculating the air flow provided by the calibrated nozzle includes the steps of:
    measuring the pressure of the air upstream of the calibrated nozzle;
    measuring the temperature of the air passing through the calibrated nozzle;
    measuring the humidity of the air passing through the calibrated nozzle;
    determining nozzle throat size of the calibrated nozzle;
    retrieving the calibration data of the calibrated nozzle from a computer memory; and
    calculating said calibrated mass air flow based on the pressure of the air, the temperature of the air, the humidity of the air, and the throat size of the calibrated nozzle.

9. The method as recited in claim 8 wherein said calibrated nozzle is a second sonic nozzle coupled to an air flow passage of the production flow stand.

10. The method as recited in claim 9 wherein the step of calculating the mass air flow based on the pressure of the air, the temperature of the air, the humidity of the air, and throat size of said second sonic nozzle, includes solving the equation:

$$\dot{M} = \frac{PAC_dC^*}{\sqrt{T}}$$

wherein:

$\dot{M}$ = calculated mass air flow through said second sonic nozzle

P = air pressure upstream of said second sonic nozzle

| | | |
|---|---|---|
| A = | the throat area of said second sonic nozzle | These values determined by calibration lab when |
| $C_d$ = | the discharge coefficient of the second sonic nozzle | nozzle is calibrated prior to installation in flow system |
| $C^*$ = | critical flow factor of the second sonic nozzle | Equation that includes the ideal gas constant for air and the humidity |
| T = | the temperature of the air through the second sonic nozzle. | of the flowing air |

\* \* \* \* \*